(12) United States Patent
Ting et al.

(10) Patent No.: US 7,537,019 B2
(45) Date of Patent: May 26, 2009

(54) SYSTEMS AND METHODS TO SLOWLY REDUCE THE PRESSURE IN A PRESSURE CHAMBER OVER TIME

(75) Inventors: Edmund Y. Ting, Kent, WA (US); Curtis L. Anderson, Puyallup, WA (US)

(73) Assignee: Avure Technologies Incorporated, Kent, WA (US)

( * ) Notice: Subject to any disclaimer, the term of this patent is extended or adjusted under 35 U.S.C. 154(b) by 566 days.

(21) Appl. No.: 11/145,554

(22) Filed: Jun. 3, 2005

(65) Prior Publication Data

US 2006/0272709 A1 Dec. 7, 2006

(51) Int. Cl.
*G05D 7/06* (2006.01)
(52) U.S. Cl. .................. 137/14; 137/487.5; 137/488
(58) Field of Classification Search .............. 137/487.5, 137/488, 14, 12
See application file for complete search history.

(56) References Cited

U.S. PATENT DOCUMENTS

| | | | |
|---|---|---|---|
| 5,316,745 A | 5/1994 | Ting et al. | |
| 5,344,609 A | 9/1994 | Long | |
| 5,523,053 A | 6/1996 | Dudek | |
| 5,593,714 A | 1/1997 | Hirsch | |
| 5,944,048 A * | 8/1999 | Bump et al. | ............. 137/487.5 |
| 6,162,392 A | 12/2000 | Platz et al. | |
| 6,823,884 B2 * | 11/2004 | Kern et al. | ..................... 137/14 |

FOREIGN PATENT DOCUMENTS

| | | |
|---|---|---|
| EP | 0713654 A1 | 5/1996 |
| WO | WO 04/000451 A2 | 12/2003 |

OTHER PUBLICATIONS

International Search Report dated Oct. 25, 2006.

\* cited by examiner

*Primary Examiner*—Kevin L Lee
(74) *Attorney, Agent, or Firm*—Harness, Dickey & Pierce PLC (57) ABSTRACT

Systems and methods for performing a stepwise depressurization of a high-pressure fluid (liquid) filled chamber are shown and described. At least two valves are controllably opened and closed in a sequence to release a predetermined amount of pressure from the high-pressure chamber. At least some of the pressurized fluid released from the high-pressure chamber is stored, at least temporarily, in a second pressure chamber. The second pressure chamber is located between the two controllable valves. A control system controls the valves in response to a signal from at least one pressure sensor coupled to the high-pressure chamber. Additional components can be included in the system such as a pressure intensifier and a high-pressure pump, both coupled to the high-pressure chamber, and at least one other pressure sensor to improve the accuracy of the measured pressure in the high-pressure chamber.

21 Claims, 5 Drawing Sheets

SYSTEMS AND METHODS TO SLOWLY REDUCE THE PRESSURE IN A PRESSURE CHAMBER OVER TIME

TECHNICAL FIELD

This disclosure generally relates to systems and methods of reducing the pressure in a highly pressurized chamber in a controlled manner over a long period of time.

BACKGROUND OF THE INVENTION

Highly pressurized chambers are used in a variety of industries in the processing of organic or inorganic substances and can operate at pressures from 2000 to over 7,000 times atmospheric pressure. In the pharmaceutical and biotechnology industries, high-pressure processing is used to inactivate, sterilize or modify biological substances, to include a variety of medicines and drugs, for example.

In the food industry, pressure chambers are used to process food substances to inactivate pathogens and microorganisms in the food. Pressure treating food substances does not expose foods to the potentially damaging effects of high temperatures and therefore helps to improve the food's palatability, nutritional quality, texture, color, and can also be used as a means of preservation without adding preservatives. High-pressure treatment may take place at initial product temperatures ranging from below room temperature to temperatures approaching 100 C. Pressure treated food substances such as ready-to-eat meats, prepared vegetables, fruit juices, and other products have benefited from high-pressure processing.

Pressure processing can have significant benefits in terms of changed protein function, enhanced or reduced enzyme action, and cellular membrane destruction. These effects can lead to the inactivation of certain microorganisms. Small macromolecules that are responsible for flavor, color, odor, and nutrition, are typically not changed by pressure. An article by Avure Technologies, <http://www.fresherunderpressure.com/science_hpp_review.htm>, discusses the uses, benefits, mechanisms, advantages, and remaining considerations regarding high-pressure processing.

High-pressure processing compresses and dissolves gas present in the product, thus rapid depressurization may result in greater cellular damage due to a rapid expansion of the gas. Controlled depressurization can control the texture of the resulting product. Also, since pressure is one of the primary thermodynamic variables controlling complex biomolecular structure, high-pressure can be used to modify biomolecular conformation state. Some biomolecules have high sensitivity to variations in temperature or pressure. Thus the use of high-pressure to process these substances requires the precise control of processing parameters though out the processing cycle. These parameters include: pressure, temperature, time at pressure, rate of pressurization, and rate of depressurization. The ability to reduce pressure in a controlled manner allows for delicate structures to remain near equilibrium. For example, dissolved gas will be able to diffuse from structures without cellular rupture and meta-stable conformational molecular states may be better retained.

The current approach used to depressurize a high-pressure chamber is to open a small orifice and allow the pressure to rapidly decrease by venting fluid from the pressure chamber through the small orifice. This approach achieves a depressurization time of only a few minutes, which is not slow enough to prevent structure disruption. The use of direct venting also is more difficult when the processing volume is small. Even a small leak will cause a significant loss of pressure.

For processing large volumes, multiple orifices can be used to extend the depressurization time to a period of hours (i.e., approximately one hour or more). The number of orifices will be increased as the pressure is reduced to maintain the selected depressurization rate. Accordingly, this is a complex approach and could involve a large number of high-pressure components. Thus, there is a need for an improved system and method to control the depressurization rate of substances during the depressurization of a high-pressure operation.

SUMMARY OF THE INVENTION

This disclosure relates to systems and methods for performing a stepwise depressurization of a high-pressure chamber over a selected, relatively long period of time. At least two valves are controllably opened and closed in a sequence to release a predetermined amount of pressure from a high-pressure chamber. At least some of the pressurized fluid released from the high-pressure chamber is stored, at least temporarily, in a second pressure chamber. The second pressure chamber is located between the two valves. A control system controls the valves in response to a signal from at least one pressure sensor coupled to the high-pressure chamber. Additional components can be included in the system such as a pressure intensifier and a high-pressure pump, both coupled to the high-pressure chamber. In addition, at least one additional pressure sensor can operate with the first pressure sensor to improve the accuracy of the measured pressure in the high-pressure chamber.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with high-pressure systems and methods of operating the same have not necessarily been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Any headings provided herein are for convenience only and do not interpret the scope or meaning of the claimed invention.

The systems and methods described herein are not limited to organic substances such as pharmaceutical drugs and food substances, for example, but may be used on a variety of substances, to include products such as wood, metal, plastic, etc. Thus, the use of the term "substances" is not meant to limit or narrow the scope of the invention, but instead is to be interpreted in a general and broad sense that refers to both organic and inorganic products.

The following description relates generally to systems and methods of depressurizing a highly pressured liquid filled chamber in a controlled manner over a relatively long period of time as compared to conventional systems. Overall, the systems and methods, as described herein, may minimize or even eliminate undesired effects on the substances being processed when the pressure chamber is depressurized at too fast of a rate. Although the selected pressure will vary depending on the application, pressures in the range of 200-600 MPa are often used and thought of when referring to high-pressure processing. It will be understood that other variables in the process are also selected according to the application, as determined by one of ordinary skill in the art. These other variables include such things as the temperature at which the substance is processed and the amount of time the substance is held under pressure, commonly referred to as the dwell time or hold time.

Currently, pressure processing of a substance, for example, to destroy microorganisms, can be done in batches. In conventional batch processing, the substance to be pressure treated is placed into a carrier that is in turn placed into a pressure chamber filled with pressure media, for example, water. The pressure chamber is closed and pressurized to a selected pressure, which is held for a selected period of time. After the selected period of time, the pressure chamber is rapidly depressurized by venting the pressurized fluid through an orifice, and then the treated product is removed from the pressure vessel.

Figure 1A:
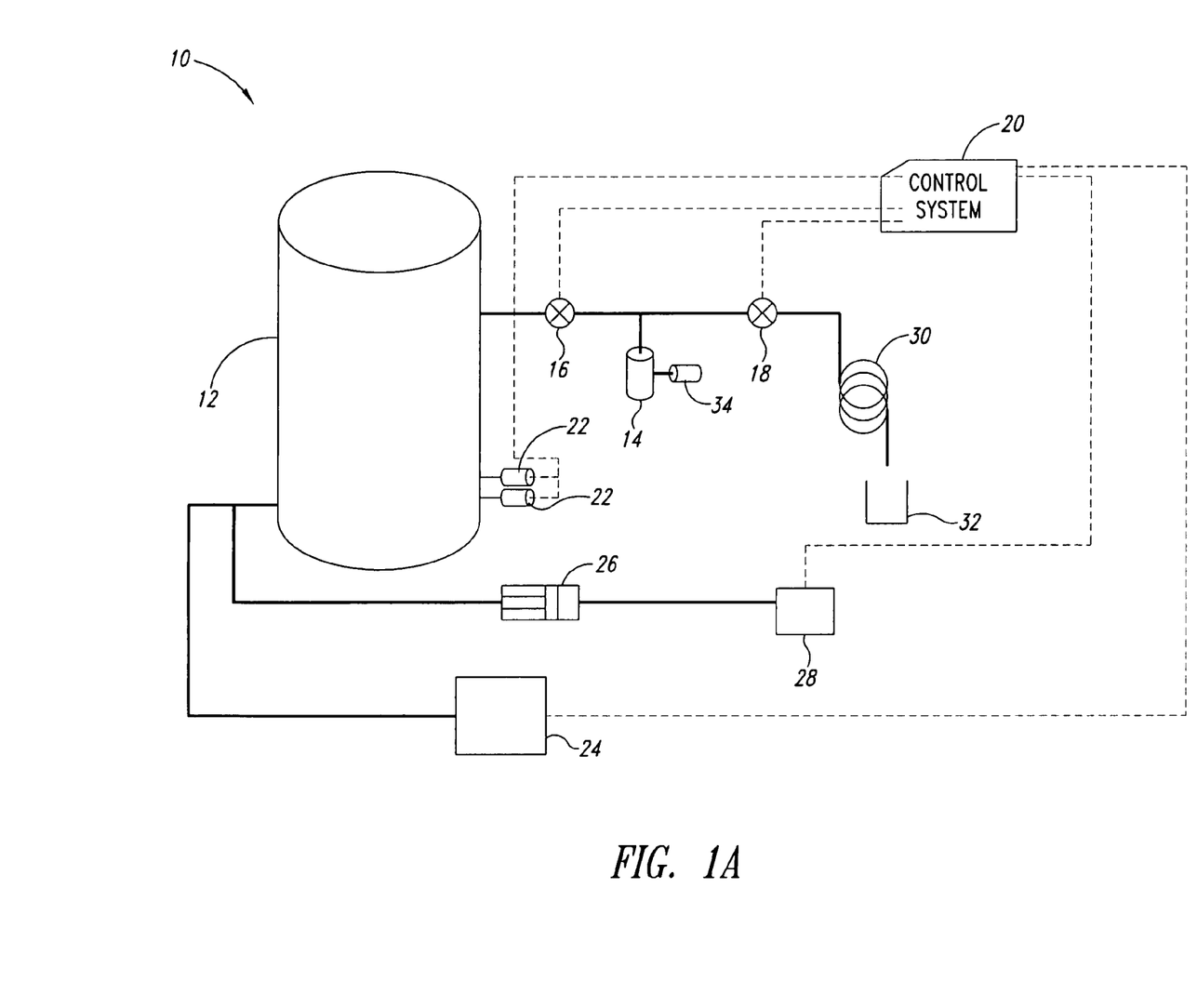
FIG. 1A is a schematic view of a system for depressurizing a main pressure chamber in a controlled manner according to one illustrated embodiment.
Figure 1B:
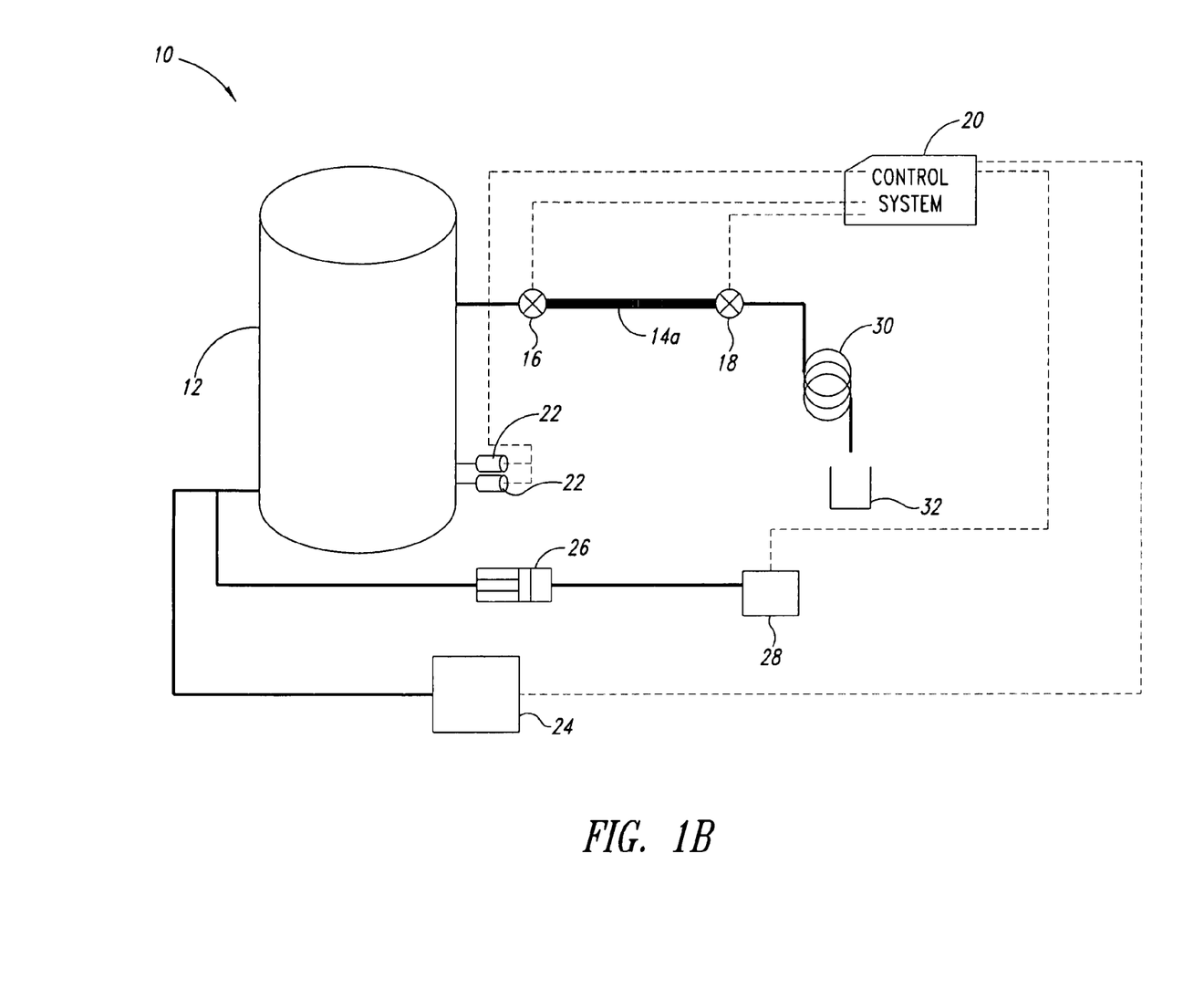
FIG. 1B is a schematic view of a system for depressurizing a main pressure chamber in a controlled manner and temporarily storing a volume of fluid in a second pressure chamber according to another illustrated embodiment.

FIG. 1A shows a system 10 to depressurize a main pressure chamber 12 according to one illustrated embodiment. The system 10 includes a second pressure chamber 14, a first valve 16, a second valve 18, a control system 20, and at least one pressure sensor 22, also commonly referred to as a transducer. The second pressure chamber 14 is configured with a sufficient volume to at least temporarily receive an amount of pressurized fluid that is permitted to flow through the first valve 16 from the main pressure chamber 12. In one embodiment, the second pressure chamber 14 is a pressure vessel that is significantly smaller than the main pressure chamber 12. In an alternate embodiment shown in FIG. 1B, the second pressure chamber 14a is a tube located between the first valve 16 and the second valve 18.

The first valve 16 is located between the main pressure chamber 12 and the second pressure chamber 14 and is configured to allow an amount of pressurized fluid from the main pressure vessel 12 to enter the second pressure chamber 14 when the first valve 16 is open.

The second valve 18 is located downstream of the second pressure chamber 14. The first valve 16 and the second valve 18 are sequentially controlled to establish a stepwise depressurization of the main pressure chamber 12 as described in the operational description below.

The control system 20 is a programmable logic controller (PLC) according to the illustrated embodiment. However, it is understood and appreciated that other types of microprocessors and systems that are capable of automated timing and pressure monitoring can be used instead of the PLC. The control system 20 is coupled to the first valve 16, the second valve 18, and the at least one pressure sensor 22. In one embodiment, the control system 20 is also coupled to a high-pressure pump 24 and a smaller capacity high-pressure backup source 28.

The control system 20 receives signals from the at least one pressure sensor 22 and uses this information to control the first valve 16, the second valve 18, the high-pressure pump 24, and the high-pressure backup source 28, according to a number of operational parameters programmed into the control system 20. The operational parameters and/or recorded operational data can be downloaded from the control system 20 or uploaded to the control system 20 through a serial communications link. The control system 20 communicates with the first valve 16, the second valve 18, the high-pressure pump 24, and the high-pressure backup source 28 electrically, electro-optically, and/or electro-magnetically.

The at least one pressure sensor 22 is coupled to the main pressure chamber 12 to monitor the pressure therein. In the illustrated embodiment of FIG. 1A, two pressure sensors 22 are actually shown. One reason for having two pressure sensors 22 is to maximize the resolution of the pressure measurement and to account for any limits on the accuracy of the type of pressure sensor being used. Further, measuring the pressure with multiple pressure sensors 22 can make the system more redundant, for example if one pressure sensor 22 malfunctions or is improperly calibrated for some reason. Multiple pressure sensors 22 can also be used as a diagnostic tool, for example to determine when one of the pressure sensors 22 requires re-calibration.

When multiple pressure sensors 22 are employed, each sensor 22 independently measures the pressure in the main pressure chamber 12. The control logic in the controller 20 combines the measured pressure values and calculates an average pressure. This average pressure can be the pressure measurement that is transferred in the programmable logic to ultimately control at least some of the other components in the system, such as the first valve 16, for example. It is understood and appreciated that additional pressure sensors 22 (i.e., more than two pressure sensors) can be coupled to the main pressure chamber to further improve the resolution, accuracy, and redundancy of the system and process. In one embodiment, the control logic of the controller 20 combines the measured pressure values and calculated pressure changes based on a volume of fluid released per valve operation cycle.

The high-pressure pump 24 is used to initially pressurize the main pressure chamber 12 before each operational cycle. The high-pressure pump 24 can also be utilized to pressurize the high-pressure backup source 28. The high-pressure backup source 28, coupled to a programmable high-pressure intensifier/pump 26, can be used to maintain a programmed pressure in the main pressure chamber 12. One reason for having the high-pressure backup source 28 coupled to a programmable high-pressure intensifier/pump 26 is to allow the system 10 to adjust for small leakages from the valves or from the seals of the main pressure chamber, which could cause an undesired decrease of the pressure in the main pressure chamber 12. The high-pressure backup source 28 is a reservoir, whereas one type of programmable high-pressure intensifier/ pump 26 is an air-over-oil intensifier pump to operate an oil-over-water high-pressure intensifier 26, according to one embodiment.

In addition to the aforementioned components, in one embodiment the system 10 includes a flow restrictor 30, a drain 32, and a pressure sensor 34 coupled to the second pressure chamber 14 according to the illustrated embodiment. While the flow restrictor 30 may take many forms, in one embodiment the flow restrictor 30 functions as a backpressure device having a loop of small diameter coil tubing that restricts the flow of pressurized fluid coming from the second valve 18. The flow restrictor 30 creates a backpressure (i.e., positive pressure) at the second valve 18 to slow the depressurization rate of the second pressure chamber 14 as the second pressure chamber 14 approaches atmospheric pressure.

The flow restrictor 30 is an optional component that may be used in the high-pressure system described above to maintain a positive pressure in the second pressure chamber 14. Maintaining the positive pressure in the second pressure chamber 14 helps to reduce cavitation within the second valve 18 and thus minimize cavitation damage to the valve components. In low-pressure systems (i.e., <200 MPa), however, cavitation is not a severe problem. Accordingly, it is understood that the flow restrictor 30 is not needed for low-pressure systems. The drain 32 receives the depressurized fluid and either discharges the fluid or routes the fluid to a re-circulation unit (not shown).

Additionally or alternatively, a sensor 34, such as a fluid level sensor and/or pressure sensor, is coupled to the second pressure chamber 14 to monitor the fluid level and/or pressure of the second pressure chamber 14. As will be described in more detail below, on option for sequencing the opening and closing of the first valve 16 and the second valve 18 by the control system 20 may depend on the measured fluid level and/or pressure in the second pressure chamber 34.

Figure 1C:
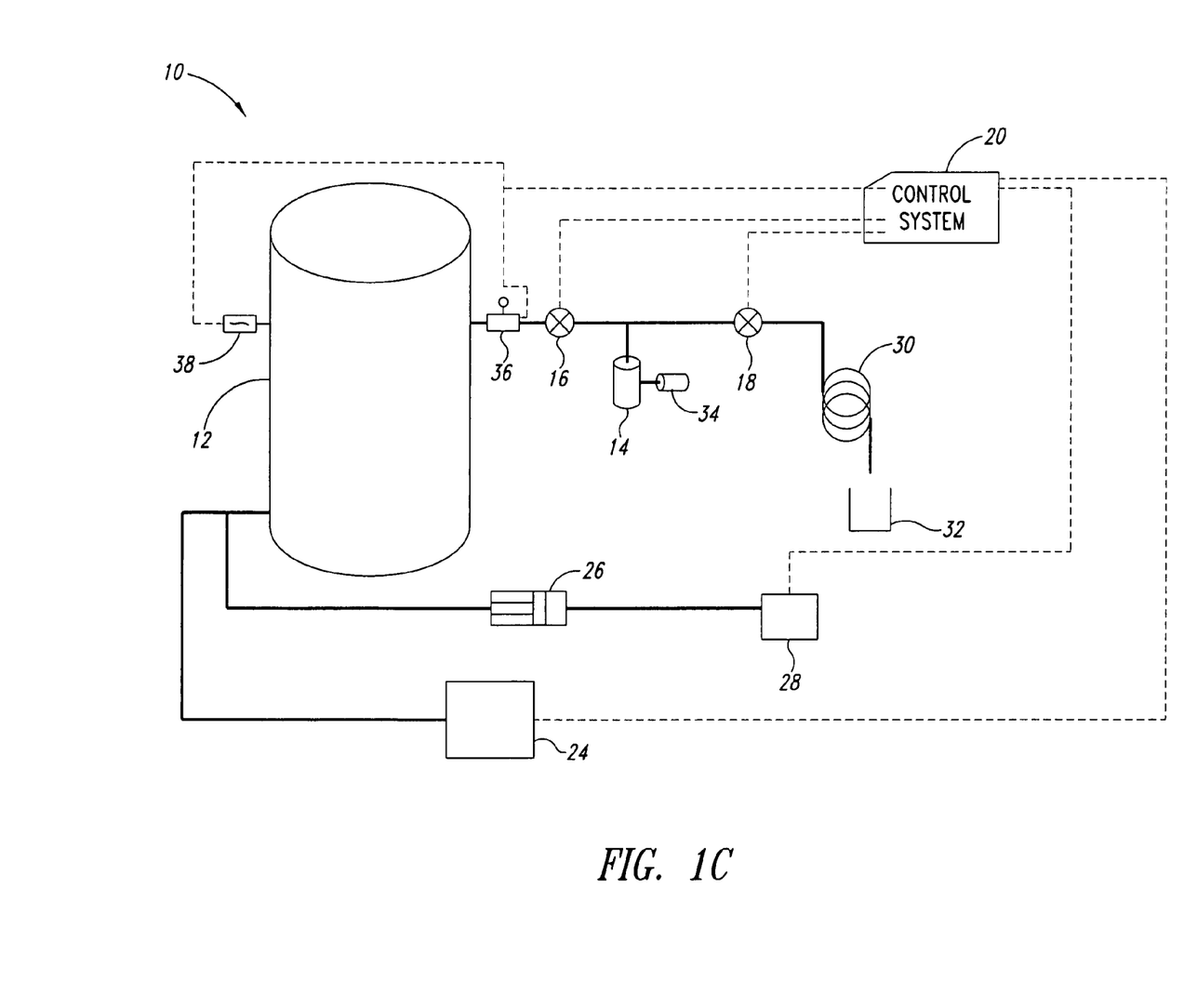
FIG. 1C is a schematic view of a system for depressurizing a main pressure chamber in a controlled manner and detecting a pressure drop in the main pressure chamber with alternate measuring devices according to one illustrated embodiment.

FIG. 1C shows yet another embodiment of the system 10 that utilizes a measurement device coupled to the main pressure chamber 12 to detect a change in a first parameter associated with the main pressure chamber 12. Either in addition to or as an alternative to the pressure sensor 22, as previously described, the measurement device could be a volumetric flow rate monitor 36 and/or a fluid density meter 38. In one embodiment, there is a mathematical correlation between a change in the fluid density (the first parameter) in the chamber 12, and the pressure in the chamber. Density can be measured using the acoustic velocity of the water in the vessel. In another embodiment, there is a physical/mathematical correlation between a volume of fluid removed from the chamber over a period of time (i.e., volumetric flow rate) and a pressure drop in the chamber 12. These parameters, methods of measuring these parameters, and the resulting physical/mathematical correlations are known in the art and can be programmed, input, output, manipulated, and/or controlled by the controller 20. In addition, it is understood that other devices and methods for determining the pressure in either pressure chamber 12, 14, either directly or indirectly, can be used independently or in combination with any of the embodiments of the system 10. Further, more than one measuring device can be employed to increase the accuracy and provide system redundancy, as described above in reference to the multiple pressure sensors 22.

Figure 2:
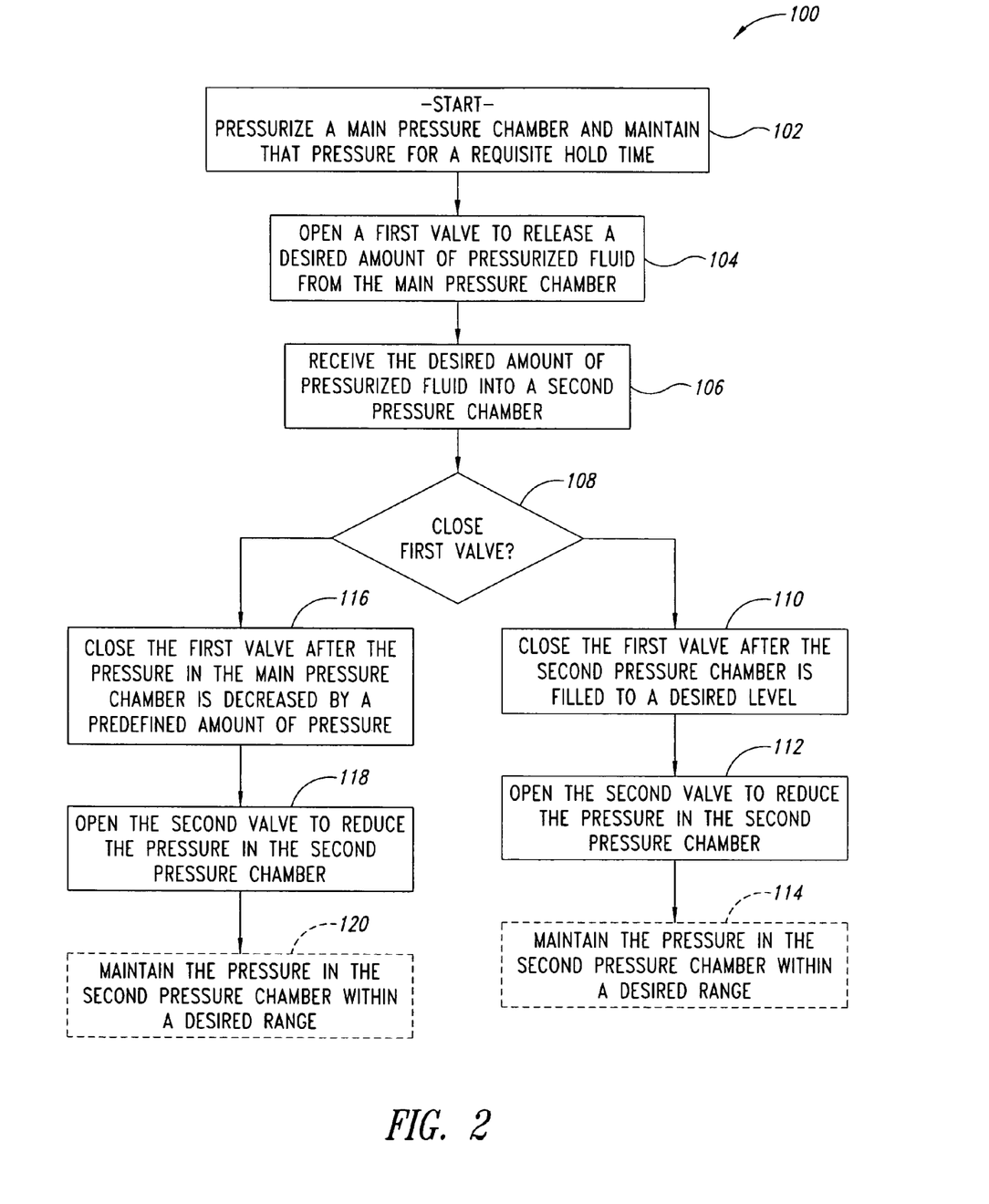
FIG. 2 is a flowchart for a method of depressurizing a main pressure chamber in a controlled manner according to one embodiment.

FIG. 2 shows a flowchart describing an operational method 100 for slowly depressurizing a pressure chamber 12 according to one embodiment. However, before depressurization can begin, the main pressure chamber 12 is initially pressurized at step 102. The initial pressurization of the main pressure chamber 12 is accomplished using a high-pressure pump 24 coupled to the main pressure chamber 12. After the main chamber 12 achieves the desired pressure, that pressure will be maintained for a requisite dwell or hold time, which is dependent on the type of substance being high-pressure processed. The programmable high-pressure intensifier/pump 26 coupled to the high-pressure backup source 28 is used to maintain the pressure in the main pressure chamber 12. Under high-pressure conditions, small leakages may occur from the seals of the main pressure chamber 12 and cause undesired fluctuations in the pressure of the main pressure chamber 12. Accordingly, the programmable high-pressure intensifier/ pump 26, coupled to the control system 20 is controllably operated to maintain the pressure in the main pressure chamber 12, not only during the hold time, but also at any time during an operational cycle of the system 10.

The depressurizing process commences when the first valve 16 is commanded into an open position by the control system 20 while the second valve 18 is kept closed at step 104. A volume of fluid flows from the pressure chamber 12 through the first valve 16 into the second pressure chamber 14. The first valve 16 is kept open until a desired amount of pressurized fluid is released from the main pressure chamber 12 or until the pressure chamber 12 experiences a selected drop in pressure as discussed in greater detail below. At step 106, the desired amount of pressurized fluid is deposited in the second pressure chamber 14.

At step 108, the control system 20 determines when to close the first valve 16. In one embodiment, the first valve 16 is closed after the secondary pressure chamber 14 is filled to a desired level, which can be detected by the level sensor 34 (FIG. 1) according to step 110. Next, the second valve 18 is opened to allow pressurized fluid from the second pressure chamber 14 to decompress to near atmospheric pressure in step 112. The fluid from the second pressure chamber 14 flows through the second valve 18 and is discharged to the drain 32. Optionally at step 114, the second valve 18 is opened, but at least some of the pressurized fluid in the second pressure chamber 14 is not totally decompressed.

In step 114, the backpressure device 30 maintains a positive pressure in the second pressure chamber 14 to keep the pressure in the second pressure chamber 14 from dropping below a selected level. Once the pressure in the second pressure chamber comes within the selected level, the control system 20 commands the second valve 18 to close. For example, if an operating pressure in the second pressure chamber 14 were about 100 MPa, then the backpressure device 30 would stop the pressure in the second pressure chamber 14 from falling below about 50 MPa±5 MPa, for example. In another example, the backpressure device 30 is configured to prevent the pressure in the second pressure chamber 14 from falling below 5 MPa±2 MPa. It is appreciated that the positive pressure level that is maintained in the second pressure chamber 14 is a variable parameter that can be selected according to the operating pressure in the second pressure chamber 14. As such, the examples provided herein are for illustrative purposes and are not meant to limit or narrow the scope of the claimed invention.

One purpose for maintaining the positive pressure in the second pressure chamber 14 is to minimize or prevent valve erosion in either or both of the valves 16, 18. Another reason is to minimize or prevent cavitations in the operating pressure lines, the first valve 16, the second valve 18, or any combination of the above components. In addition, once the pressure in the main pressure chamber 12 is sufficiently low, the first valve 16 and the second valve 18 can be opened contemporaneously.

According to an alternate embodiment, the first valve 16 is closed after the pressure in the main pressure chamber 12 decreases by a predefined amount of pressure according to step 116. Recall that at least one pressure sensor 22 monitors the pressure in the main pressure chamber 12 and communicates with the control system 20. After the first valve 12 is closed, the control system 20 commands the second valve 18 to open so that at least some of the fluid from the second pressure chamber 14 is permitted to flow through the second valve 18 and be discharged to the drain 32 according to step 118. Optionally at step 120 and similar to step 114, the back-pressure device 30 maintains a positive pressure in the second pressure chamber 14. Similar to the previous embodiment, when the pressure in the main pressure chamber 12 is sufficiently low, the first valve 16 and the second valve 18 can be opened contemporaneously.

Figure 3:
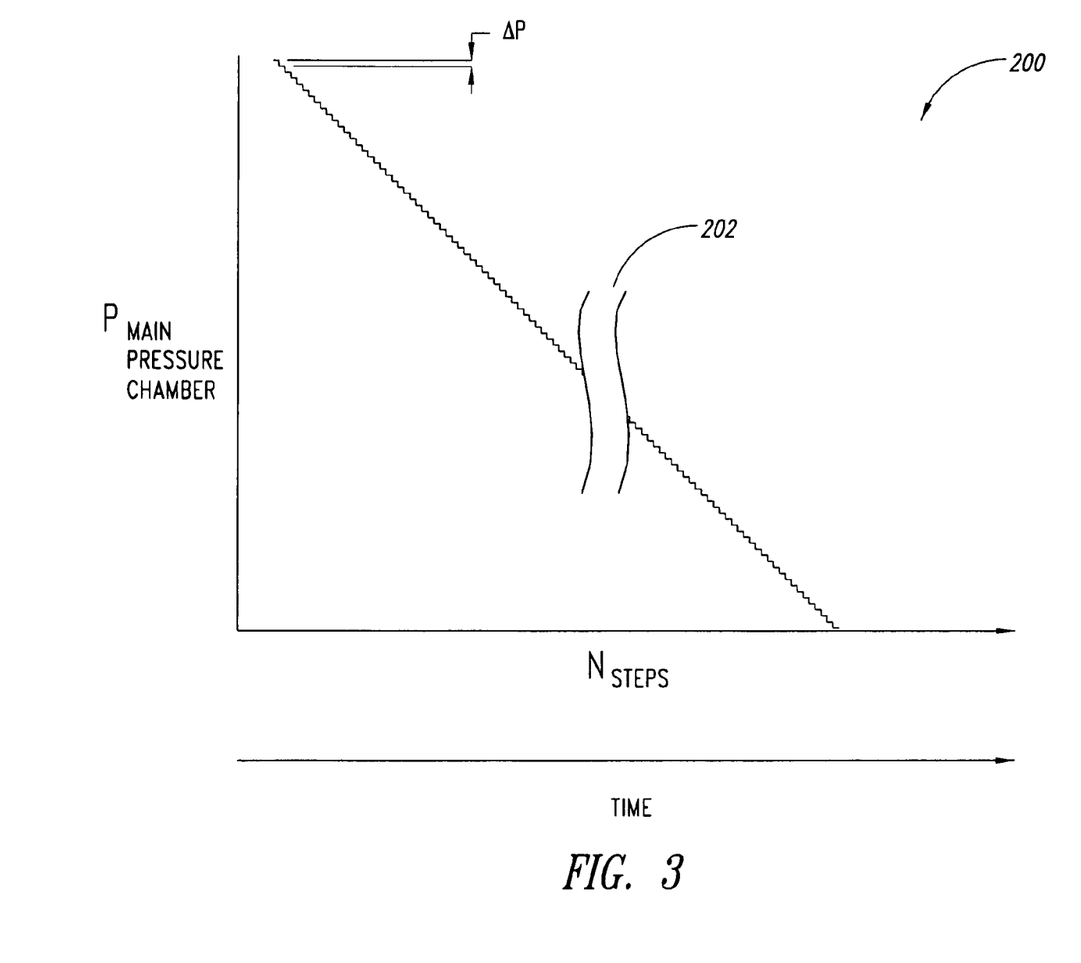
FIG. 3 is a diagram showing a stepwise depressurization of a main pressure chamber according to one embodiment.

The chart 200 of FIG. 3 schematically shows that the depressurization of the main pressure chamber 12 occurs in a substantially stepwise manner over a relatively long period of time, as compared to conventional systems. While the length of the depressurization period may vary, in one embodiment the period is greater than at least one hour, when the depressurization of the main pressure chamber 12 is practiced in accordance with the present invention. The vertical axis of the chart shows the pressure, $P_{MAIN\ PRESSURE\ CHAMBER}$ in the main pressure chamber 12. The horizontal axes show the number of steps, $N_{STEPS}$ and the amount of TIME that it takes to depressurize the main pressure chamber 12, respectively. The gap 202 indicates that the depressurization process takes a relatively long period of time. The pressure drop, $\Delta P$, indicates the incremental decrease in total amount of pressure experienced by the main pressure chamber 12 during the depressurizing process. In one embodiment, the pressure drop, $\Delta P$, is constant for each successive step, $N_{STEPS}$. In another embodiment, the pressure drop, $\Delta P$, is varied for each successive step, $N_{STEPS}$, for example if the pressure drop, $\Delta P$, is based on a percentage of the total pressure in the main pressure chamber 12. In one embodiment, the control system 20 controllably operates the first and second valves 16, 18 to reduce the pressure in the main pressure chamber 12 by a range of about 0.1% to 5.0% of the total pressure in the main pressure chamber 12 for each incremental step each successive step, $N_{STEPS}$.

The control system 20 is used to control the depressurization process to achieve a desired depressurization rate. In one exemplary embodiment, each step, $N_{STEPS}$, targets a pressure drop in the main pressure chamber 12 of no more than 10 MPa. This is approximately equal to about a 0.1° C. change in temperature for most water-based substances. This would mean that a depressurization from 300 MPa to atmospheric pressure should take place in no less than 30 steps. For optimum fine control, the decompression rate can be controlled to take place in smaller increments, for example down to a change of one MPa per step.

In combination with or independent from the aforementioned embodiments, a method for measuring the pressure in either the main pressure chamber 12 and/or the intermediate pressure chamber 14 includes detecting the pressure in the pressure chamber 12, 14 with at least two pressure transducers at a first time. The at least two pressure transducers generate signals in response to the pressure in the respective pressure chamber 12, 14 at the first time. The controller 20 receives the generated signals and computationally combines the generated signals to determine a calculated pressure value that corresponds to the pressure in the pressure chamber.

In another embodiment, a method for measuring a pressure drop in at least one of the respective pressure chambers 12, 14 includes detecting a first pressure in the pressure chamber 12, 14 with at least two pressure transducers 22 at a first time. The at least two pressure transducers 22 are operable to generate first signals in response to the first pressure in the pressure chamber 12, 14. The controller 20 determines a first calculated pressure value based on the first signals generated by the at least two pressure transducers 22. Subsequently, an amount of fluid is released from the pressure chamber 12, 14. The at least two pressure transducers 22 then detect a second pressure in the pressure chamber 12, 14 with at a second time, which occurs after the release of the amount of fluid. The at least two pressure transducers generate second signals in response to the second pressure in the pressure chamber 12, 14. The controller 20 determines a second calculated pressure value based on the second signals generated by the at least two pressure transducers. In addition, the controller 20 compares the first calculated pressure value with the second calculated pressure value to determine the pressure drop in the pressure chamber 12, 14.

From the foregoing it will be appreciated that, although specific embodiments of the invention have been described herein for purposes of illustration, various modifications may be made without deviating from the spirit and scope of the invention. For example, it will be understood that the various components and steps of the systems and methods described above may be used in various combinations with each other. Accordingly, the invention is not limited except as by the appended claims.

The invention claimed is:

1. A system to reduce the pressure in a main pressure chamber, the system comprising:
a first valve in fluid communication with the main pressure chamber;
an intermediate pressure chamber to at least temporarily receive an amount of pressurized fluid that passes through the first valve from the main pressure chamber;
a second valve controllably coupled with the first valve and configured to periodically reduce the pressure in the intermediate pressure chamber;
at least one sensor coupled to the main pressure chamber to detect a change in a first parameter associated with the main pressure chamber; and
a control system responsive to the at least one sensor to controllably operate the first and second valves such that the pressure in the main pressure chamber is incrementally decreased over a substantial amount of time.

2. The system of claim 1 wherein the intermediate pressure chamber is a pressure vessel located between the first valve and the second valve.

3. The system of claim 1 wherein the intermediate pressure chamber is a tube located between the first valve and the second valve.

4. The system of claim 1 wherein the control system controllably operates the first and second valves to reduce the pressure in the main pressure chamber by a range of about 0.1 to 5.0% of the total pressure in the main pressure chamber for each incremental decrease.

5. The system of claim 1, further comprising:
a high-pressure intensifier in fluid communication with the main pressure chamber and in fluid communication with a pressure source, the high-pressure intensifier operable to selectively add a volume of fluid to the main pressure chamber.

6. The system of claim 1, further comprising:
a backpressure device coupled to the second valve.

7. The system of claim 6 wherein the backpressure device is a loop of small diameter coiled tubing.

8. The system of claim 1 wherein the at least one sensor coupled to the main pressure chamber is a first pressure sensor.

9. The system of claim 8, further comprising:
a second pressure sensor coupled to the main pressure chamber, the control system operable to computationally determine a calculated pressure value in response to signals generated by the first pressure sensor and the second pressure sensor.

10. The system of claim 1 wherein the at least one sensor coupled to the main pressure chamber is a volumetric flow rate transducer.

11. The system of claim 1 wherein the at least one sensor coupled to the main pressure chamber is a fluid density sensor.

12. The system of claim 1 wherein the first parameter associated with the main pressure chamber is the pressure in the main pressure chamber.

13. A method of performing a stepwise depressurization of a main high-pressure chamber over a selected period of time, the method comprising:
controllably opening a first valve to allow an amount of fluid from the main high-pressure chamber to pass through the first valve;
receiving at least some of the amount of fluid that passed through the first valve into a second pressure chamber;
closing the first valve when a desired pressure reduction is achieved in the main high-pressure chamber; and
controllably opening a second valve to allow pressurized fluid in the second pressure chamber to pass through the second valve after the first valve is closed.

14. The method of claim 13 wherein closing the first valve includes closing the first valve after the pressure in the main high-pressure chamber decreases by a predetermined amount.

15. The method of claim 13 wherein closing the first valve includes closing the first valve after the second pressure chamber receives a predetermined amount of fluid from the main high-pressure chamber.

16. The method of claim 13, further comprising:
closing the second valve before the pressure in the second pressure chamber reaches atmospheric pressure.

17. The method of claim 16 wherein closing the second valve before the pressure in the second pressure chamber reaches atmospheric pressure includes maintaining the pressure in the second pressure chamber to be in a range of about 5 to 50 MPa.

18. The method of claim 17 wherein maintaining the pressure in the second pressure chamber includes developing a backpressure in a pressure line between the second valve and a backpressure device.

19. The method of claim 13, further comprising:
adding an amount of fluid to the main pressure chamber with a high-pressure intensifier during the decompression process should leaks exceed the amount of liquid removed.

20. The method of claim 13, further comprising:
controllably and contemporaneously opening the first valve and the second valve after the pressure in the main high-pressure chamber is below a selected threshold.

21. A system for performing a stepwise depressurization of a main high-pressure chamber over a selected period of time, the system comprising:
first valve means for permitting a first amount of pressurized fluid to exit from the main high-pressure chamber when the first valve means is in an open position;
receiving means for receiving the first amount of pressurized fluid that passes through the first valve means;
second valve means for permitting a second amount of pressurized fluid to exit from the receiving means when the second valve means is in an open position; and
control means for sequentially controlling the opening and closing of the first valve means and the second valve means to controllably depressurize the main high-pressure chamber over the selected period of time.

* * * * *